United States Patent
Rahimi et al.

(10) Patent No.: US 9,502,980 B2
(45) Date of Patent: Nov. 22, 2016

(54) CIRCUIT AND METHOD FOR PRODUCING AN AVERAGE OUTPUT INDUCTOR CURRENT INDICATOR

(71) Applicant: Infineon Technologies Americas Corp., El Segundo, CA (US)

(72) Inventors: Amir M. Rahimi, Irvine, CA (US); Parviz Parto, Laguna Niguel, CA (US); Saurabh Jayawant, Aliso Viejo, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 82 days.

(21) Appl. No.: 14/548,092

(22) Filed: Nov. 19, 2014

(65) Prior Publication Data

US 2015/0077074 A1    Mar. 19, 2015

Related U.S. Application Data

(63) Continuation-in-part of application No. 13/338,013, filed on Dec. 27, 2011, now Pat. No. 9,035,624.

(60) Provisional application No. 61/914,334, filed on Dec. 10, 2013.

(51) Int. Cl.
*H02M 3/158* (2006.01)
*H02M 3/156* (2006.01)
*H02M 1/00* (2006.01)
*H02M 3/157* (2006.01)

(52) U.S. Cl.
CPC .......... *H02M 3/1588* (2013.01); *H02M 3/156* (2013.01); *H02M 3/158* (2013.01); *H02M 3/157* (2013.01); *H02M 2001/0009* (2013.01); *Y02B 70/1466* (2013.01)

(58) Field of Classification Search
CPC ............ H02M 2001/0009; H02M 2001/0012; H02M 3/155; H02M 3/156; H02M 3/158; H02M 3/1588
See application file for complete search history.

(56) References Cited

U.S. PATENT DOCUMENTS

| | | | | |
|---|---|---|---|---|
| 6,381,159 B2 * | 4/2002 | Oknaian | ............... | H02M 3/156 323/282 |
| RE38,940 E * | 1/2006 | Isham | ................. | H02M 3/1588 323/224 |
| 7,710,084 B1 * | 5/2010 | Guo | ...................... | G01R 19/003 323/224 |
| 7,902,803 B2 * | 3/2011 | Peng | ..................... | H02M 3/157 323/283 |
| 7,919,952 B1 * | 4/2011 | Fahrenbruch | ......... | H02M 3/156 323/222 |
| 2005/0162142 A1 * | 7/2005 | Kernahan | ............. | H02M 3/157 323/283 |
| 2005/0280404 A1 * | 12/2005 | LeFevre | .............. | H02M 3/1584 323/282 |
| 2006/0015274 A1 * | 1/2006 | Trandafir | .............. | H02M 3/157 702/64 |
| 2006/0017424 A1 * | 1/2006 | Wood | .................... | H02M 3/156 323/274 |
| 2008/0224625 A1 * | 9/2008 | Greenfeld | .......... | H05B 33/0851 315/201 |
| 2010/0090671 A1 * | 4/2010 | Zhang | ..................... | G05F 1/565 323/283 |

(Continued)

*Primary Examiner* — Fred E Finch, III
(74) *Attorney, Agent, or Firm* — Shumaker & Sieffert, P.A.

(57) ABSTRACT

In one implementation, a circuit for producing an average output inductor current indicator in a voltage converter is configured to start a counter when a high side power switch turns on, to sense a sample current through an output inductor of the voltage converter after the high side power switch turns off and when a low side power switch is on, and to register a first count of the counter when the low side power switch turns off. The circuit is further configured to register a second count of the counter when the high side power switch subsequently turns on, and to produce the average output inductor current indicator based on the sample current and the first and second counts of the counter.

20 Claims, 5 Drawing Sheets

(56) References Cited

U.S. PATENT DOCUMENTS

| | | | |
|---|---|---|---|
| 2011/0109291 A1* | 5/2011 | Tang | H02M 3/156 323/282 |
| 2012/0019226 A1* | 1/2012 | Wiktor | H02M 3/156 323/285 |
| 2012/0078556 A1* | 3/2012 | Holmberg | H02M 3/156 702/64 |
| 2012/0235649 A1* | 9/2012 | Uno | H02M 1/4225 323/210 |
| 2015/0137782 A1* | 5/2015 | Wang | G01R 19/0092 323/282 |

* cited by examiner

CIRCUIT AND METHOD FOR PRODUCING AN AVERAGE OUTPUT INDUCTOR CURRENT INDICATOR

The present application claims the benefit of and priority to a provisional application entitled "Constructing Average Inductor Current in Discontinuous Conduction Mode," Ser. No. 61/914,334 filed on Dec. 10, 2013. The disclosure in this provisional application is hereby incorporated fully by reference into the present application. The present application is also a continuation-in-part of and claims the benefit of and priority to parent patent application Ser. No. 13/338,013, filed on Dec. 27, 2011 and titled "Power Supply Circuitry and Current Measurement." The disclosure in this parent application is hereby incorporated fully by reference into the present application.

BACKGROUND

Background Art

Switched-mode power converters are used in a variety of electronic circuits and systems requiring conversion of a direct current (DC) input to a lower, or higher, DC output. For example, a switched-mode power converter may be implemented as a voltage converter, such as a buck converter, to convert a higher voltage DC input to a lower voltage DC output for use in low voltage applications in which relatively large output currents are required.

In switched-mode voltage converters that include an output inductor coupled between a switch node and the voltage converter output, it is sometimes necessary or desirable to measure the average output inductor current. Conventional approaches to measuring the average output inductor current typically utilize the DC resistance (DCR) of the output inductor itself, or a sampling resistor placed in series with the output inductor. However these conventional approaches are associated with significant disadvantages. For example, the output inductor DCR is not constant, and can vary with temperature as well as from part to part. Moreover, use of a series sampling resistor results in undesirable power losses, as well as typically requiring low pass filtering of the sampled signal. Although a technique for measuring average output inductor current that avoids some of these disadvantages has been developed, that technique is suitable only for switched-mode voltage converters operating in continuous conduction mode (CCM). Thus, there is a need in the art for a solution enabling determination of the average output inductor current that omits reliance on either the output inductor DCR or a series sampling resistor for switched-mode voltage converters configured to operate in discontinuous conduction mode (DCM).

SUMMARY

The present disclosure is directed to a circuit and method for producing an average output inductor current indicator, substantially as shown in and/or described in connection with at least one of the figures, and as set forth more completely in the claims.

DETAILED DESCRIPTION

Figure 1:
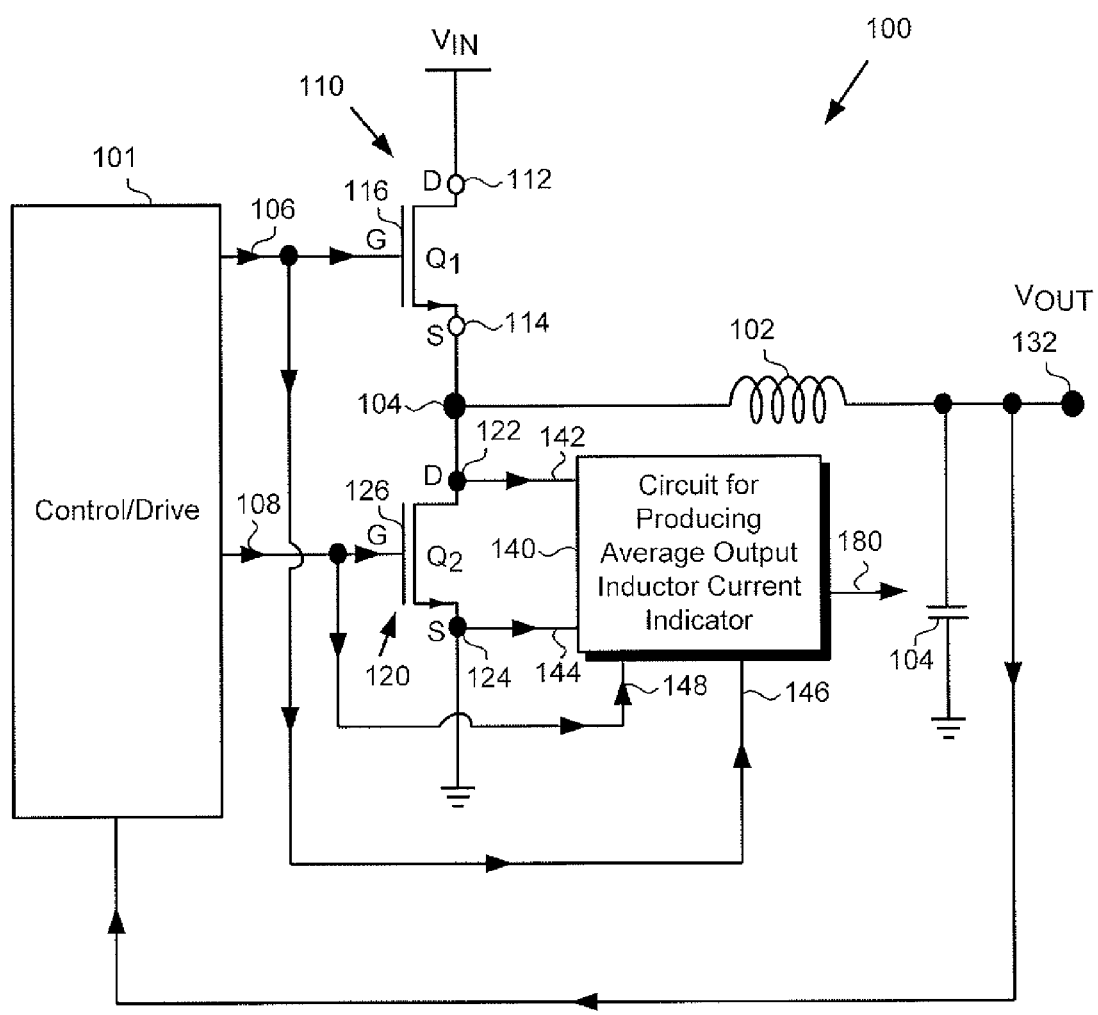
FIG. 1 shows a diagram of a switched-mode voltage converter including a circuit for producing an average output inductor current indicator, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, in switched-mode voltage converters that include an output inductor coupled between a switch node and the voltage converter output, it is sometimes necessary or desirable to measure the average output inductor current. Conventional approaches to measuring the average output inductor current typically utilize the direct current (DC) resistance of the output inductor itself (DCR), or a sampling resistor placed in series with the output inductor. However these conventional approaches are associated with significant disadvantages. For example, the output inductor DCR is not constant, and can vary with temperature as well as from part to part. Moreover, use of a series sampling resistor results in undesirable power losses, as well as typically requiring low pass filtering of the sampled signal. As further stated above, although a technique for measuring average output inductor current that avoids some of these disadvantages has been developed for switched-mode voltage converters operating in continuous conduction mode (CCM), that solution is unsuitable for discontinuous conduction mode (DCM). It is noted that the aforementioned solution for measuring average output inductor current for voltage converters operating in CCM is disclosed by U.S. patent application Ser. No. 13/338,013, filed on Dec. 27, 2011 and titled "Power Supply Circuitry and Current Measurement." This patent application is hereby incorporated fully by reference into the present application.

The present application is directed to a circuit and method designed to overcome the deficiencies in conventional approaches to identifying average output inductor current for DCM operation in a switched-mode voltage converter. The present application discloses a novel and inventive circuit and method for producing an average output inductor current indicator that relies neither on the DCR of the output inductor nor a sampling resistor placed in series with the output inductor. As a result, the present application discloses a solution enabling determination of an average output inductor current in a switched-mode voltage converter operating in DCM that provides improved accuracy, reduced cost, and increased efficiency when compared to conventional solutions.

Referring to FIG. 1, FIG. 1 shows a diagram of switched-mode voltage converter 100 including circuit 140 for producing an average output inductor current indicator, according to one implementation. Voltage converter 100 includes high side power switch 110 ($Q_1$), low side power switch 120 ($Q_2$), and control/drive block 101. High side power switch 110 and low side power switch 120 may be implemented as silicon or other group IV based power metal-oxide-semiconductor field-effect transistors (MOSFETs), for example. Accordingly, high side power switch 110 is shown to include drain 112, source 114, and gate 116, while low side power switch 120 includes drain 122, source 124, and gate 126. According to the implementation shown in FIG. 1, control/drive block 101 is coupled to gate 116 of high side power switch 110, and to gate 126 of low side power switch 120. As shown in FIG. 1, control/drive block 101 may be configured to output high side drive signal 106 to gate 116 of high side power switch 110, as well as to output low side drive signal 108 to gate 126 of low side power switch 120 As further shown in FIG. 1, circuit 140 is coupled across drain 122 and source 124 of low side power switch 120. In other words, circuit 140 has first current sense input 142 coupled to drain 122 of low side power switch 120, and second current sense input 144 coupled to source 124 of low side power switch 120. In addition, circuit 140 is shown to receive high side drive signal 106 as high drive input 146 and low side drive signal 108 as low drive input 148, and to produce average output inductor current indicator 180 as an output.

Also shown in FIG. 1 are voltage converter switch node 104 connecting source 114 of high side power switch 110 to drain 122 of low side power switch 120, voltage converter output 132, output inductor 102 coupled between switch node 104 and voltage converter output 132, and output capacitor 104. Voltage converter 100 may be implemented as a buck converter, for example, configured to receive a DC input voltage $V_{IN}$ at drain 112 of high side power switch 110 and to provide a stepped down output voltage $V_{OUT}$ at voltage converter output 132.

It is noted that although voltage converter 100 may take the form of a buck converter in some implementations, in other implementations, voltage converter 100 may be configured as a boost converter, or as a buck-boost converter, for example. It is further noted that although high side power switch 110 and low side power switch 120 are depicted as silicon or other group IV FETs in the interests of ease and conciseness of description, that representation is merely exemplary. The inventive principles disclosed herein are broadly applicable to a wide range of applications, including switched-mode voltage converters implemented using other group IV material based, or group III-V semiconductor based, power switches. As used herein, the phrase "group III-V" refers to a compound semiconductor including at least one group III element and at least one group V element. By way of example, a group III-V semiconductor may take the form of a III-Nitride semiconductor that includes nitrogen and at least one group III element, such as gallium.

Thus, although in FIG. 1, MOSFETs are used to represent high side power switch 110 and low side power switch 120, in other implementations, other types of power switches, which may be high voltage (HV) power switches, can be used to provide either or both of high side power switch 110 and low side power switch 120. It is noted that HV, when used in reference to a transistor or switch describes a transistor or switch with a voltage range from approximately two hundred volts to approximately twelve hundred volts (approximately 200V to 1200V), or higher. It is also noted that use of the term midvoltage (MV) refers to a voltage range from approximately fifty volts to approximately two hundred volts (approximately 50V to 200V). Moreover, low voltage (LV), as used herein, refers to a voltage range of up to approximately fifty volts (50V).

The types of switches suitable for use as high side power switch 110 and low side power switch 120 may include bipolar junction transistors (BJTs), insulated-gate bipolar transistors (IGBTs), and gallium nitride (GaN) or other III-Nitride or group III-V based high electron mobility transistors (HEMTs), for example.

Figure 2:
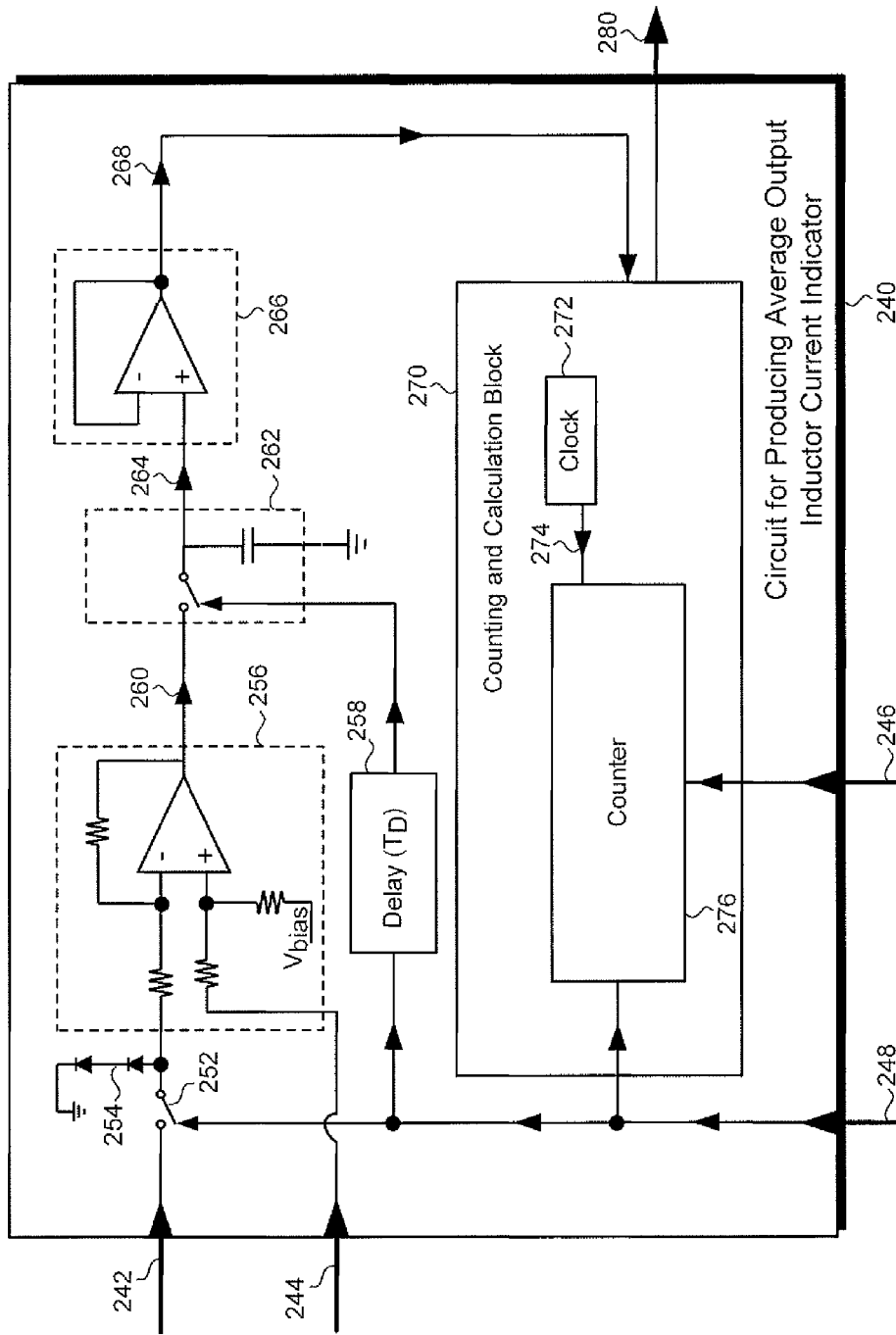
FIG. 2 shows a more detailed diagram of an exemplary circuit for producing an average output inductor current indicator suitable for use in the voltage converter of FIG. 1, according to one implementation.

Continuing to FIG. 2, FIG. 2 shows a more detailed diagram of exemplary circuit 240 for producing an average output inductor current indicator suitable for use in voltage converter 100, in FIG. 1, according to one implementation. As shown in FIG. 2, circuit 240 is configured to receive first current sense input 242, second current sense input 244, high drive input 246, and low drive input 248, and to produce average output inductor current indicator 280 as an output. Circuit 240 corresponds in general to circuit 140, in FIG. 1, and may share any of the characteristics attributed to circuit 140, above. In addition, first current sense input 242, second current sense input 244, high drive input 246, low drive input 248, and average output inductor current indicator 280, in FIG. 2, correspond respectively to first current sense input 142, second current sense input 144, high drive input 146, low drive input 148, and average output inductor current indicator 180, in FIG. 1, and may share any of the characteristics attributed to those corresponding features, above.

As shown in FIG. 2, circuit 240 includes differential amplifier 256 having a negative input terminal coupled to first current sense input 242 by switch 252, and having a positive input terminal coupled to second current sense input 244. In addition, according to the exemplary implementation shown in FIG. 2, circuit 240 further includes sample and hold block 262 coupled to delay 258 and receiving output 260 from differential amplifier 256. Exemplary circuit 240 also includes buffer 266 receiving output 264 from sample and hold block 262 and providing output 268 to counting and calculation block 270.

According to the implementation shown in FIG. 2, counting and calculation block 270 is configured to produce average output inductor current indicator 280. In addition to counter 276, counting and calculation block 270 includes clock 272 providing clock signal 274 to counter 276. Counter 276 is further configured to receive high drive input 246 and low drive input 248. Also shown in FIG. 2 are protection diodes 254 coupled to switch 252 of circuit 240. It is noted that switch 252 is configured to be closed by low drive input 248. It is further noted that circuit 240 may be implemented as an integrated circuit (IC) on a single chip or die.

Figure 3:
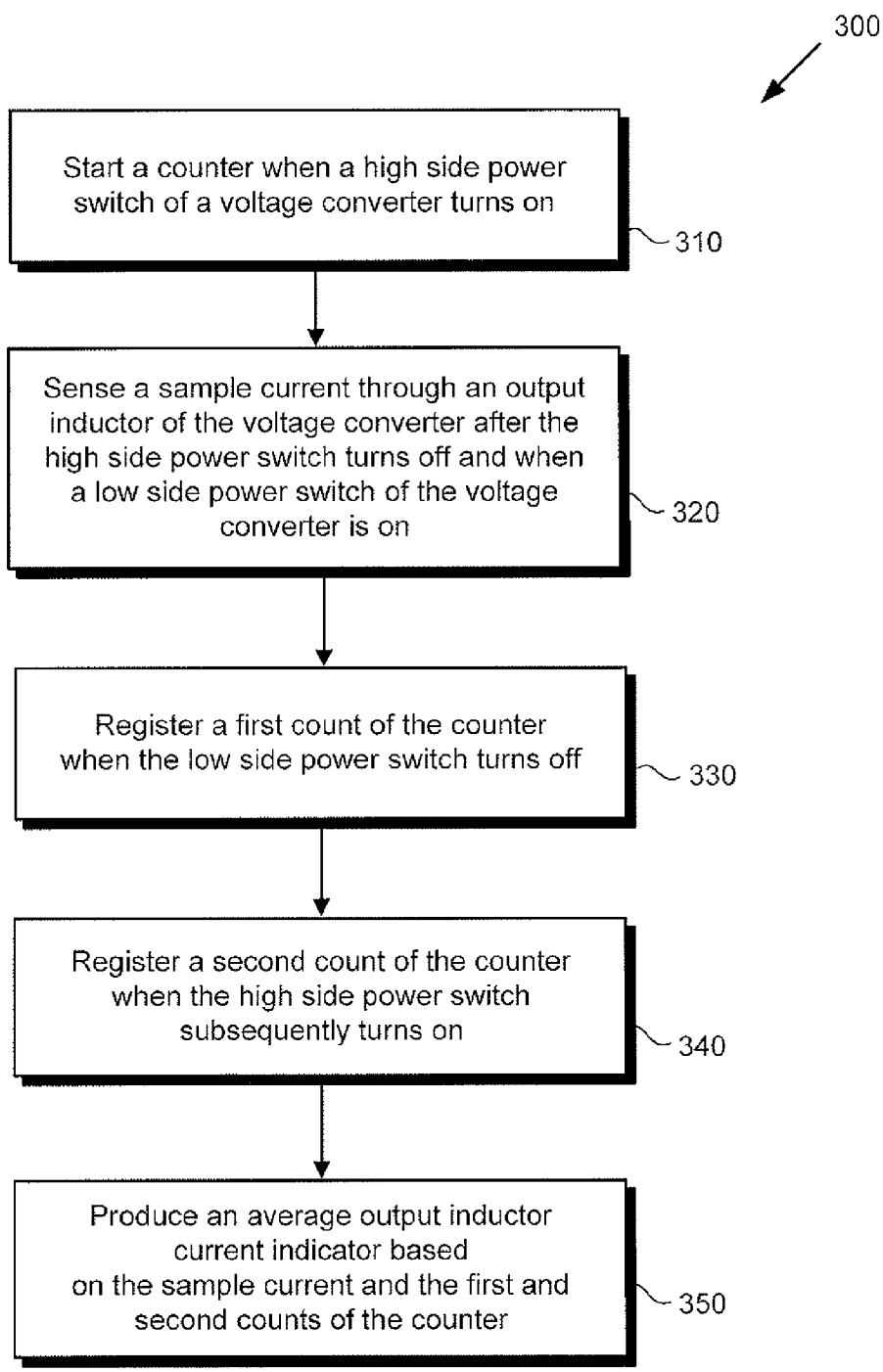
FIG. 3 shows a flowchart outlining an exemplary method for producing an average output inductor current indicator, according to one implementation.
Figure 4:
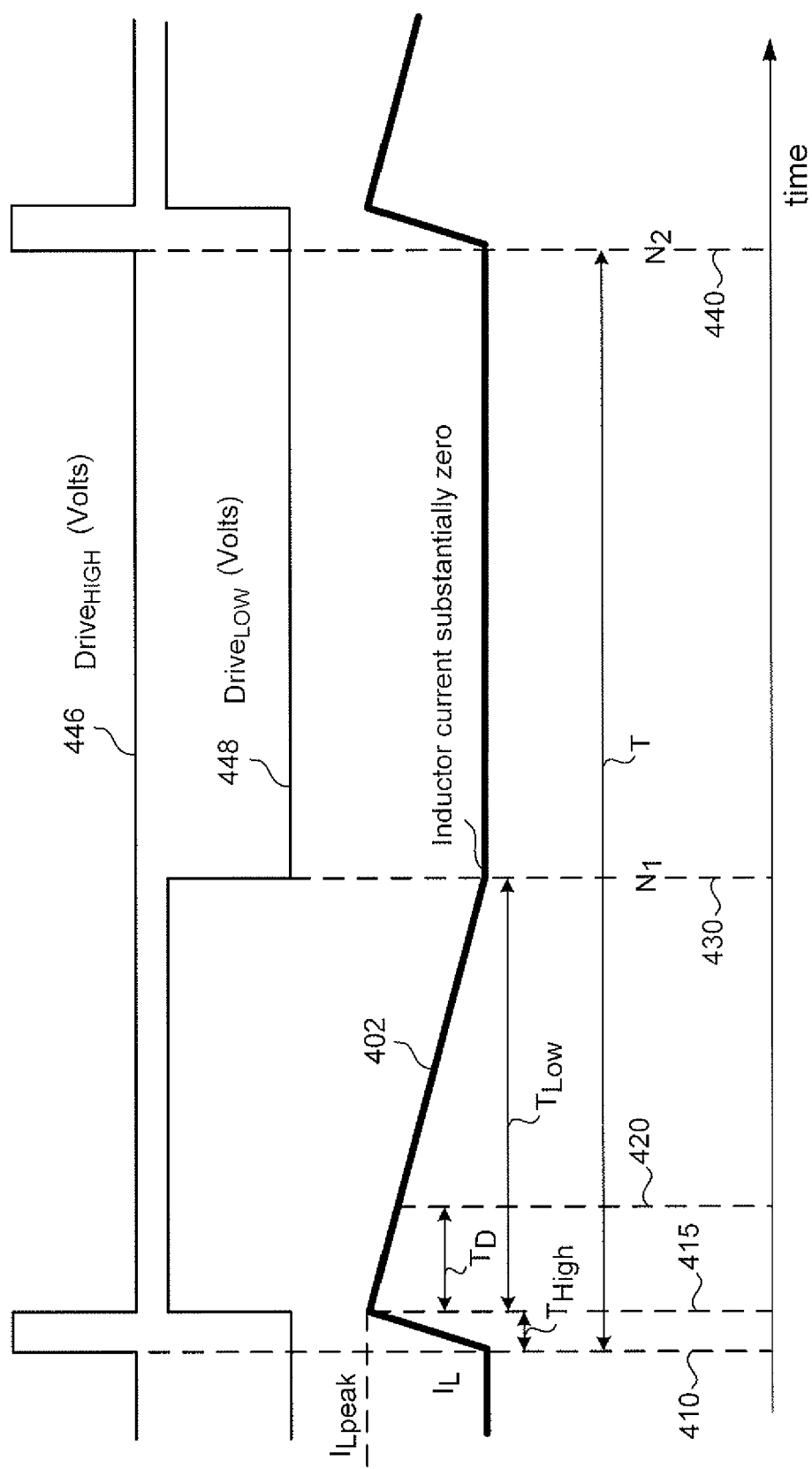
FIG. 4 shows a timing diagram depicting signals corresponding to a high side gate drive, a low side gate drive, and an output inductor current of the voltage converter of FIG. 1, according to one implementation.
Figure 5:
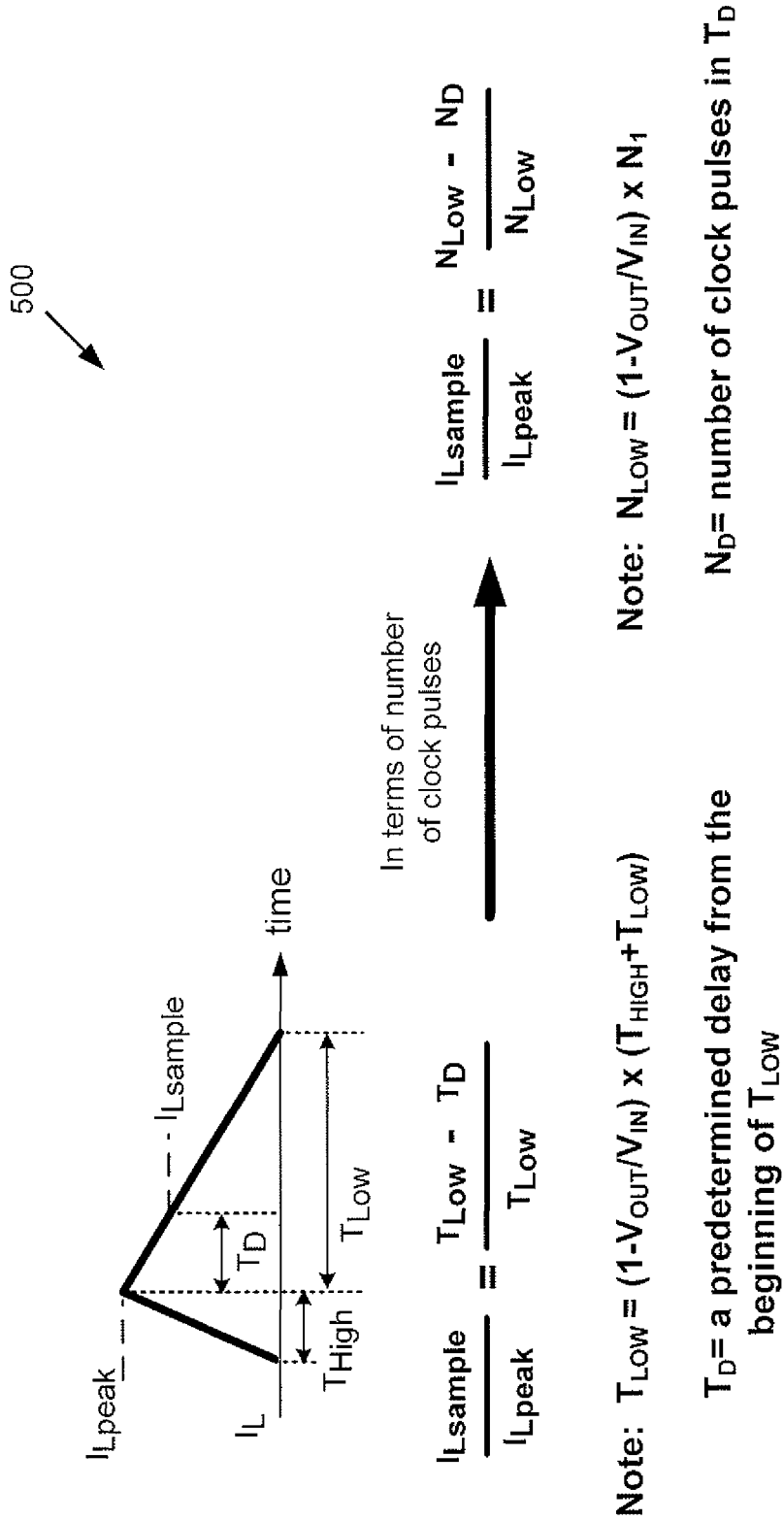
FIG. 5 shows a diagram depicting a solution for determining a peak output inductor current based on a sensed sample output inductor current, according to one implementation.

The operation of circuit 140/240 in FIG. 1/2 will be further described by reference to FIGS. 3, 4, and 5. FIG. 3 shows flowchart 300 outlining an exemplary method for producing an average output inductor current indicator, according to one implementation. FIG. 4 shows a timing diagram depicting signal traces corresponding to high drive input 246 and low drive input 248, in FIG. 2, as well as an inductor current trace corresponding to an inductor current of output inductor 102, in FIG. 1, according to one implementation. Moreover, FIG. 5 shows a diagram depicting a solution for determining a peak output inductor current based on a sensed sample output inductor current, according to one implementation. With respect to the method outlined in FIG. 3, it is noted that certain details and features have been left out of flowchart 300 in order not to obscure the discussion of the inventive features in the present application.

Referring to flowchart 300 in combination with FIG. 1 and FIG. 2, flowchart 300 begins with starting counter 276 when high side power switch 110 of voltage converter 100 turns on (action 310). Referring to FIG. 4, FIG. 4 shows high drive trace 446 corresponding to high drive input 246, low drive trace 448 corresponding to low drive input 248, and inductor current ($I_L$) trace 402 corresponding to a current through output inductor 102. In addition, FIG. 4 shows $T_{High}$ corresponding to the on-time of high side power switch 110, $T_{Low}$ corresponding to the on-time of low side power switch 120, and T corresponding to the switching period of high side power switch 110, i.e., the time interval from the rising edge of high drive trace 446 at time 410 to the next rising edge of high drive trace 446 at time 440. Also shown in FIG. 4 are first count $N_1$ of counter 276 registered at time 430, second count $N_2$ of counter 276 registered at time 440, delay time interval $T_D$, and additional times 415 and 420 that will be described in greater detail below.

Action 310 may be performed by counting and calculation block 270 of circuit 240, using clock 272 and counter 276, in response to high drive input 246. As shown in FIG. 4, counter 276 is started at time 410 when high drive trace 446 goes high. It is noted that it is desirable for clock 272 to have a clock frequency substantially greater than a switching frequency of high side power switch 110. In other words, the clock frequency of clock 272 is substantially greater than (1/T). For example, such a high frequency clock may have a clock frequency greater than or equal to approximately ten times the switching frequency (1/T) of high side switch 110.

Flowchart 300 continues with sensing a sample current through output inductor 102 of voltage converter 100 after high side power switch 110 turns off and when low side power switch 120 is on (action 320). Action 320 may be performed by circuit 240 at time 420 shown in FIG. 4. Referring to FIG. 2 in combination with FIG. 4, high drive input 246 goes low and low drive input 248 goes high at or about time 415, resulting in high side power switch 110 being turned off after an on-time $T_{High}$, and low side power switch 120 being turned on.

Low drive input 248 going high also causes switch 252 to close, resulting in first and second current sense inputs 242 and 244 being connected to the respective negative and positive input terminals of differential amplifier 256. As shown in FIG. 2, delay 258 of circuit 240 also receives low drive input 248 that is now high. Delay 258 is configured to elapse the delay time interval $T_D$, which is typically a predetermined delay time interval, before delivering, for example, a rising edge of low drive signal 248, to sample and hold block 262.

After delay time interval $T_D$, sample and hold block 262 is activated, resulting in sample and hold block 262 responding to output 260 of differential amplifier 256 beginning at time 420. As further shown by FIG. 2, output 264 of sample and hold block 262 is provided to buffer 266, which, in turn feeds output 268 corresponding to substantially real-time inductor current $I_L$ through output inductor 102, and depicted by inductor current trace 402. Thus, circuit 240 is configured to elapse delay time interval $T_D$ after low side power switch 120 turns on before sensing the sample current through output inductor 102.

Flowchart 300 continues with registering first count $N_1$ of counter 276 when low side power switch 120 turns off (action 330). Action 330 may be performed by counting and calculation block 270 of circuit 240. As shown in FIG. 4, low drive trace 448 goes low at time 430, resulting in low drive input 248 going low, and low side power switch 120 turning off after an on-time of $T_{Low}$. It is noted that counter 276 driven by clock 272 continues to run after first count $N_1$ is registered.

Flowchart 300 continues with registering second count $N_2$ of counter 276 when high side power switch 110 subsequently turns on (action 340). Action 340 may be performed by counting and calculation block 270 of circuit 240. As shown in FIG. 4, high drive trace 446 next goes high at time 440, resulting in high drive input 246 going high, and high side power switch 110 turning on. The interval between time 410 and time 440 corresponding to second count $N_2$ of counter 276, and also corresponds to the switching period T of high side switch 110. It is noted that counter 276 driven by clock 272 may be reset and restarted at time 440.

Exemplary flowchart 300 concludes with producing average output inductor current indicator 180/280 based on the sample current and the first and second counts $N_1$ and $N_2$ of counter 276 (action 350). Action 350 may be performed by counting and calculation block 270 of circuit 240. In one implementation, average output inductor current indicator 180/280 may be a calculated average current of output inductor 102 as determined by counting and calculation block 270. For example, referring to FIG. 4, the average output inductor current, or $I_{L(average)}$, can be determined in principle from the following equation:

$$I_{L(average)} = I_{L(peak)} * (T_{High} + T_{Low})/(2*T);  \quad \text{Equation 1}$$

Unfortunately, in many applications, $T_{High}$ and/or $T_{Low}$ and/or T may be variable or otherwise indeterminable. According to the solution disclosed by the present application, however, and as shown by FIG. 4, the time interval $T_{High} + T_{Low}$ may be substituted in Equation 1 by first count $N_1$ of counter 276, while the switching period T of high side power switch 110 may be substituted by second count $N_2$. As a result, Equation 1 may be expressed in terms of $N_1$ and $N_2$ as:

$$I_{L(average)} = I_{L(peak)} * N_1/(2*N_2);  \quad \text{Equation 2}$$

In other words, average output inductor current indicator 180/280 may be produced based on the peak current $I_{L(peak)}$ of output inductor 102 and the first and second counts $N_1$ and $N_2$ of counter 276.

However, measurement of the peak current $I_{L(peak)}$ of output inductor 102 may not be practicable. Nevertheless, referring to diagram 500, in FIG. 5, it becomes apparent that the peak current $I_{L(peak)}$ of output inductor 102 can be expressed in terms of the current through output inductor 102 sampled after delay time interval $T_D$ at time 420 in FIG. 4 (hereinafter "sample current" or $I_{L(sample)}$) as:

$$I_{L(peak)} = I_{L(sample)} * N_{Low}/(N_{Low} - N_D);  \quad \text{Equation 3}$$

where $N_{Low}$ is the number of clock pulses in $T_{Low}$, $N_{Low} = (1 - V_{OUT}/V_{IN}) * N_1$; and $N_D$ = the number of clock pulses in $T_D$.

Because the clock frequency of clock 272, the delay time interval $T_D$, $V_{OUT}$, and $V_{IN}$ are known or knowable, Equation 3 enables determination of peak current $I_{L(peak)}$ of output inductor 102 based on sample current $I_{L(sample)}$ through output inductor 102. Moreover, substitution of Equation 3 into Equation 2 enables determination of the average output inductor current $I_{L(average)}$ based on known or knowable parameters including the sample current $I_{L(sample)}$ and the first and second counts $N_1$ and $N_2$ of counter 276 as:

$$I_{L(average)} = I_{L(sample)} * N_{Low}/(N_{Low} - N_D) * N_1/(2*N_2);  \quad \text{Equation 4}$$

It is noted that because $N_{Low}$ may be expressed in terms of N1 and the respective input and output voltages $V_{IN}$ and $V_{OUT}$ of voltage converter 100, average output inductor current indicator 180/280 may be produced based on $V_{IN}$ and $V_{OUT}$, as well as the sample current $I_{L(sample)}$ and the first and second counts $N_1$ and $N_2$ of counter 276.

Thus, the present application discloses a novel and inventive circuit and method for producing an average output inductor current indicator that relies neither on the DCR of the output inductor nor a sampling resistor placed in series with the output inductor. As a result, the present application discloses a solution enabling determination of an average output inductor current in a switched-mode voltage converter operating in DCM that provides improved accuracy, reduced cost, and increased efficiency when compared to conventional solutions.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. A circuit for producing an average output inductor current indicator in a voltage converter, said circuit configured to:
    start a counter when a high side power switch turns on;
    sense a sample current through an output inductor of said voltage converter after said high side power switch turns off and when a low side power switch is on;
    register a first count of said counter when said low side power switch turns off;
    register a second count of said counter when said high side power switch subsequently turns on;
    produce said average output inductor current indicator based on said sample current and said first and second counts of said counter.

2. The circuit of claim 1, wherein said circuit is further configured to drive said counter using a clock having a clock frequency greater than a switching frequency of said high side power switch.

3. The circuit of claim 1, wherein said circuit is further configured to drive said counter using a high frequency clock having a clock frequency greater than or equal to approximately ten times a switching frequency of said high side power switch.

4. The circuit of claim I, wherein said circuit is further configured to elapse a delay time interval after said low side power switch turns on before sensing said sample current.

5. The circuit of claim 1, wherein said circuit is further configured to determine a peak current of said output inductor based on said sample current.

6. The circuit of claim 5, wherein said circuit is configured to produce said average output inductor current indicator based on said peak current and said first and second counts of said counter.

7. The circuit of claim 1, wherein said circuit is configured for use in one of a buck converter, a boost converter, and a buck-boost converter.

8. The circuit of claim 1, wherein said circuit is configured to be coupled across a drain and a source of said low side power switch.

9. The circuit of claim 1, wherein said circuit is configured to receive a high side drive signal for said high side power switch and a low side drive signal for said low side power switch.

10. The circuit of claim 1, wherein said circuit is configured to produce said average output inductor current indicator based on an input voltage and an output voltage of said voltage converter and said sample current and said first and second counts of said counter.

11. A method for producing an average output inductor current indicator in a voltage converter, said method comprising:
    starting a counter when a high side power switch turns on;
    sensing a sample current through an output inductor of said voltage converter after said high side power switch turns off and when a low side power switch is on;
    registering a first count of said counter when said low side power switch turns off;
    registering a second count of said counter when said high side power switch subsequently turns on;
    producing said average output inductor current indicator based on said sample current and said first and second counts of said counter.

12. The method of claim 11, further comprising driving said counter using a clock having a clock frequency greater than a switching frequency of said high side power switch.

13. The method of claim 11, further comprising driving said counter using a high frequency clock having a clock frequency greater than or equal to approximately ten times a switching frequency of said high side power switch.

14. The method of claim 11, further comprising elapsing a delay time interval after said low side power switch turns on before sensing said sample current.

15. The method of claim 11, further comprising determining a peak current of said output inductor based on said sample current.

16. The method of claim 15, further comprising producing said average output inductor current indicator based on said peak current and said first and second counts of said counter.

17. The method of claim 11, wherein said voltage converter is implemented as one of a buck converter, a boost converter, and a buck-boost converter.

18. The method of claim 11, wherein said method is performed by a circuit coupled across a drain and a source of said low side power switch.

19. The method of claim 11, further comprising receiving a high side drive signal for said high side power switch and a low side drive signal for said low side power switch.

20. The method of claim 11, further comprising producing said average output inductor current indicator based on an input voltage and an output voltage of said voltage converter and said sample current and said first and second counts of said counter.

\* \* \* \* \*